United States Patent
Suzuki

(10) Patent No.: US 9,684,616 B2
(45) Date of Patent: *Jun. 20, 2017

(54) MOTOR CONTROL APPARATUS AND MOTOR CONTROL METHOD

(71) Applicant: Haruyuki Suzuki, Kanagawa (JP)

(72) Inventor: Haruyuki Suzuki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 566 days.

This patent is subject to a terminal disclaimer.

(21) Appl. No.: 14/193,132

(22) Filed: Feb. 28, 2014

(65) Prior Publication Data

US 2014/0258580 A1    Sep. 11, 2014

(30) Foreign Application Priority Data

Mar. 5, 2013 (JP) .................................. 2013-043443

(51) Int. Cl.
  G06F 13/32 (2006.01)
  B41J 29/38 (2006.01)
  H02P 23/00 (2016.01)

(52) U.S. Cl.
  CPC .............. *G06F 13/32* (2013.01); *B41J 29/38* (2013.01); *H02P 23/0077* (2013.01)

(58) Field of Classification Search
  CPC  G06F 13/24; G06F 13/32; G05B 2219/13001
  See application file for complete search history.

(56) References Cited

U.S. PATENT DOCUMENTS

| 4,845,418 | A | * | 7/1989 | Conner | .................. H02P 21/34 318/436 |
| 5,023,778 | A | * | 6/1991 | Simon, Jr. | ............... G06F 15/17 703/27 |
| 2012/0068643 | A1 | | 3/2012 | Suzuki | |
| 2012/0306419 | A1 | | 12/2012 | Suzuki | |
| 2013/0106326 | A1 | | 5/2013 | Kamatani et al. | |
| 2013/0106327 | A1 | | 5/2013 | Kamatani et al. | |
| 2013/0257341 | A1 | | 10/2013 | Suzuki et al. | |
| 2015/0185736 | A1 | | 7/2015 | Suzuki et al. | |

FOREIGN PATENT DOCUMENTS

| JP | 04-281396 | 10/1992 |
| JP | 2004-322909 | 11/2004 |
| JP | 2006-338367 | 12/2006 |
| JP | 2011-044006 | 3/2011 |
| JP | 2013-220006 A | 10/2013 |

* cited by examiner

*Primary Examiner* — Farley Abad

(74) *Attorney, Agent, or Firm* — Harness, Dickey & Pierce, P.L.C.

(57) ABSTRACT

A motor control apparatus includes: a driving control unit that performs driving control of a motor in accordance with a drive command; an interrupt control unit that starts and executes interrupt processing for performing the driving control at an interrupt cycle; a first processing unit that executes same first processing every time the interrupt processing starts; and a second processing unit that selects and executes a different piece of processing from second processing every time the interrupt processing starts. The interrupt control unit executes at least one piece of the first processing before executing the second processing in the interrupt processing.

17 Claims, 16 Drawing Sheets

FIG.13

| PROCESSING | scnt | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| TARGET POSITION GENERATION | * | | | | * | | | | * | | | |
| TARGET SPEED GENERATION | | * | | | | * | | | | * | | |
| CURRENT POSITION DETECTION | * | * | * | * | * | * | * | * | * | * | * | * |
| CURRENT SPEED DETECTION | * | * | * | * | * | * | * | * | * | * | * | * |
| POSITION COMPARISON | | | * | | | | * | | | | * | |
| SPEED COMPARISON | * | * | * | * | * | * | * | * | * | * | * | * |
| LPF | * | * | * | * | * | * | * | * | * | * | * | * |
| SPEED CONTROL OPERATION | | | | * | | | | * | | | | * |
| | 0 | 1 | 2 | 3 | 0 | 1 | 2 | 3 | 0 | 1 | 2 | 3 |
| | (scnt mod 4) | | | | | | | | | | | |

MOTOR CONTROL APPARATUS AND MOTOR CONTROL METHOD

CROSS-REFERENCE TO RELATED APPLICATIONS

The present application claims priority to and incorporates by reference the entire contents of Japanese Patent Application No. 2013-043443 filed in Japan on Mar. 5, 2013.

BACKGROUND OF THE INVENTION

1. Field of the Invention

The present invention relates to a motor control apparatus and a motor control method for controlling driving of a motor.

2. Description of the Related Art

Motors are widely used for controlling paper conveyance of printer apparatuses and printing apparatuses, controlling head positions of disk storage devices, and the like. These apparatuses control driving of the motor so as to drive the motor at a predetermined speed or perform positional control by moving a target to a desired position. As a method of controlling the driving of the motor, known is a technique in which a positional sensor and/or a speed sensor are provided on a motor shaft or a movement target and a current position and/or a current speed are compared with a target position and/or a target speed by using output signals from these sensors, and thus a motor driving amount is feedback-controlled.

A technique of executing the feedback control of the motor by digital control is widely used. For example, the driving of the motor is controlled by performing sampling of a sensor signal regularly to perform a control processing operation and output the driving amount of the motor by using a microcomputer that includes a central processing unit (CPU), a memory, and an input/output port. The processing of controlling the driving of the motor includes requesting an interrupt to the CPU at a predetermined sampling cycle by using an interrupt mechanism that is included in the microcomputer generally and performing the control processing operation in the interrupt processing, in general.

Japanese Patent Application Laid-open No. 2006-338367 discloses a technique of performing driving control of the motor by using a timer interrupt relating to digital control of the motor driving by the interrupt processing. That is to say, in Japanese Patent Application Laid-open No. 2006-338367, the driving processing of the motor is executed in accordance with a timer interrupt signal that is generated at the predetermined interval. Then, when delay is generated due to execution of processing corresponding to another interrupt signal, a delay time until the driving processing is executed from the generation of the interrupt signal is calculated. Subsequently, corrected position information is calculated from the delay time so as to update position information, and feedback control is performed. The technique as disclosed in Japanese Patent Application Laid-open No. 2006-338367 can suppress lowering of accuracy of the control when the interrupt processing is delayed.

Furthermore, Japanese Patent Application Laid-open No. 2011-44006 discloses a technique of grasping a current rotating position of a motor by using a two-phase counter and a one-phase counter. The two-phase counter detects respective two-phase pulse signals that are output from encoders so as to perform counting processing. The one-phase counter detects an A-phase pulse signal only so as to perform counting processing. That is to say, in Japanese Patent Application Laid-open No. 2011-44006, a target speed based on positional error as a difference between a target position and the current position grasped by the two-phase counter and the one-phase counter is output. In addition, the magnitude of the positional error is determined. When the magnitude of the positional error is a relatively small value, the two-phase counter is used to obtain the current position. On the other hand, when the magnitude of the positional error is a relatively large value, the one-phase counter is used to obtain the current position. The technique as disclosed in Japanese Patent Application Laid-open No. 2011-44006 enables the current rotating position of the motor to be grasped without using a counter having high performance or an application specific integrated circuit (ASIC) alternative to the counter.

In the digital control, there is a problem in that when another interrupt processing has a priority, a control operation is delayed and control accuracy is lowered. In order to solve the problem, in Japanese Patent Application Laid-open No. 2006-338367, the delay time is measured to correct the control processing. This suppresses deterioration of the control accuracy due to another interrupt processing. Even when the technique as disclosed in Japanese Patent Application Laid-open No. 2006-338367 is used, there is a risk that lowering of some accuracy occurs due to another interrupt processing.

Furthermore, in Japanese Patent Application Laid-open No. 2006-338367, the control operation processing from the sampling to the output of the driving amount is delayed and this leads to the occurrence of phase delay of a control amount. The phase delay of the control amount reduces a phase margin, resulting in impairing of control stability in some cases. This causes a possibility that an unstable state such as oscillation is caused.

On the other hand, in the feedback control of the rotating position or the rotating speed of the motor by using the microcomputer as disclosed in Japanese Patent Application Laid-open No. 2011-44006, delay of the control processing due to another interrupt processing does not occur because another interrupt processing is not received.

Also in Japanese Patent Application Laid-open No. 2011-44006, if the number of pieces of processing to be executed in the interrupt processing is larger, there is a possibility that the pieces of processing are not finished within a predetermined cycle of the interrupt processing. When the pieces of processing are not finished within the predetermined cycle of the interrupt processing, there is a risk that a normal operation cannot be performed and the control fails. The problem also occurs in Japanese Patent Application Laid-open No. 2006-338367.

When the cycle of the control interrupt is made shorter, control performance can be improved. In addition, when the cycle of the control interrupt is made shorter, the count processing can be performed by software of the interrupt processing without using expensive hardware such as a counter. When the interrupt cycle is made shorter, the possibility that the pieces of processing are not finished within the interrupt cycle is further increased. Although this problem can be solved by using the CPU capable of achieving high-speed processing, there has been a problem in that the cost for the CPU main body and peripheral structures of the CPU is increased in this case.

In view of the above-mentioned circumstances, there is a need to perform driving control of a motor with high accuracy without using expensive hardware.

SUMMARY OF THE INVENTION

It is an object of the present invention to at least partially solve the problems in the conventional technology.

A motor control apparatus includes: a driving control unit that performs driving control of a motor in accordance with a drive command; an interrupt control unit that starts and executes interrupt processing for performing the driving control at an interrupt cycle; a first processing unit that executes same first processing every time the interrupt processing starts; and a second processing unit that selects and executes a different piece of processing from second processing every time the interrupt processing starts. The interrupt control unit executes at least one piece of the first processing before executing the second processing in the interrupt processing.

A motor control method includes: performing driving control of a motor in accordance with a drive command; starting and executing interrupt processing for performing the driving control at an interrupt cycle; executing same first processing every time the interrupt processing starts; and selecting and executing a different piece of processing from second processing every time the interrupt processing starts. At the starting and executing of the interrupt processing, at least one piece of the first processing is executed before executing the second processing in the interrupt processing.

A non-transitory computer-readable storage medium in which computer-readable program codes are stored, wherein the program codes when executed cause a computer to execute: performing driving control of a motor in accordance with a drive command; starting and executing interrupt processing for performing the driving control at an interrupt cycle; executing same first processing every time the interrupt processing starts; and selecting and executing a different piece of processing from second processing every time the interrupt processing starts. At the starting and executing of the interrupt processing, at least one piece of the first processing is executed before executing the second processing in the interrupt processing.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a table illustrating an example of an execution schedule of the interrupt processing in the third embodiment;

DETAILED DESCRIPTION OF THE PREFERRED EMBODIMENTS

Hereinafter, described are embodiments of a motor control apparatus and a motor control method with reference to the accompanying drawings.

First Embodiment

Figure 1:
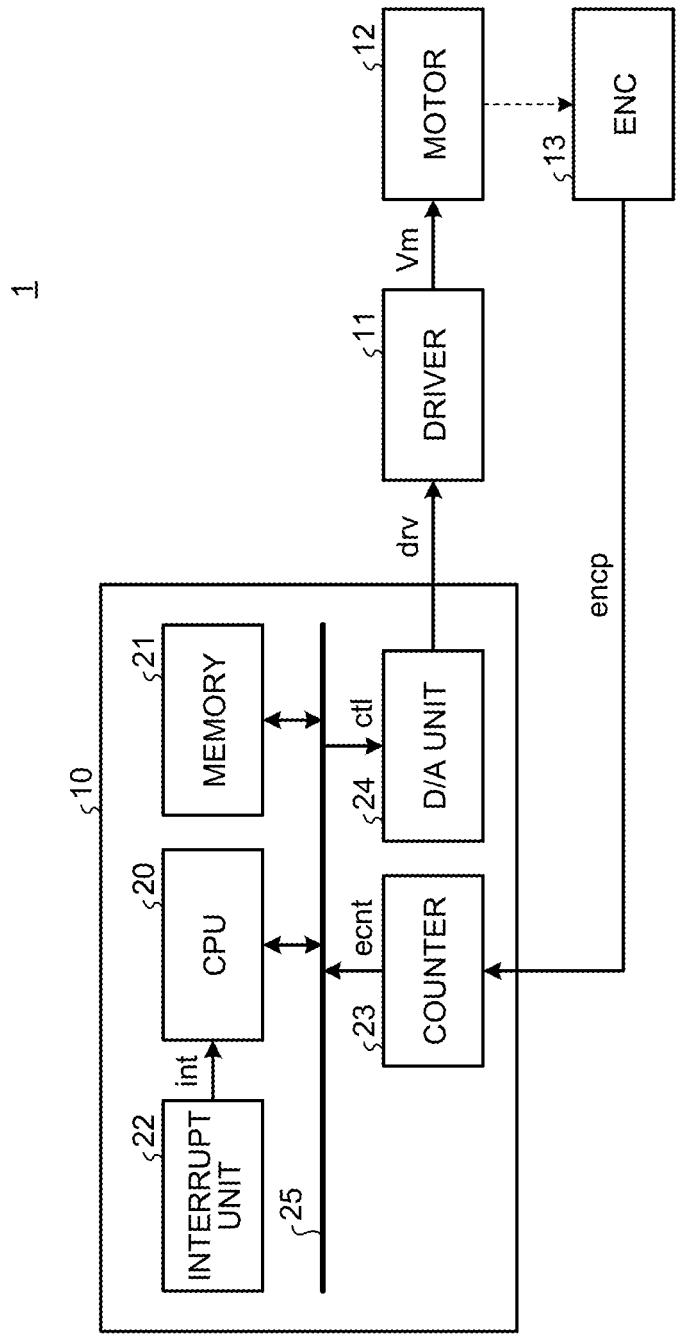
FIG. 1 is a block diagram illustrating an example of the configuration of a motor control apparatus according to a first embodiment.

FIG. 1 is a diagram illustrating an example of the configuration of a motor control apparatus according to a first embodiment. In FIG. 1, this motor control apparatus 1 includes a control unit 10, a driver 11, and an encoder (ENC) 13. The driver 11 generates a driving voltage Vm to drive a motor 12 in accordance with a drive command signal dry that is output from the control unit 10. The encoder 13 outputs an encoded signal encp in accordance with rotation of the motor 12. The control unit 10 generates the drive command signal dry for controlling at least one of a rotating position and a rotating speed of the motor 12 based on the encoded signal encp.

The drive command signal dry may be a signal for directing driving with a voltage value or may be a signal for directing driving with a pulse width by using pulse width modulation (PWM). In the same manner, the driving voltage Vm may be voltage output or a PWM signal.

The motor 12 may be a rotating motor of which rotating shaft rotates or a linear motor of which operating portion makes linear motion. The encoder 13 outputs the encoded signal encp that changes periodically in accordance with a rotating angle of the rotating shaft when the motor 12 is the rotating motor. On the other hand, the encoder 13 outputs the encoded signal encp that changes periodically in accordance with a linear motion position of the motor 12 when the motor 12 is the linear motor. Hereinafter, it is assumed that the motor 12 is the rotating motor and the encoded signal encp is the signal that changes periodically in accordance with the rotating angle of the motor shaft.

To be more specific, the encoder 13 is configured by attaching a disc-like member to the rotating shaft of the motor 12 and providing slits on the circumference of the disc-like member at a constant interval. A photoelectric converter detects slit transmitted light from a light source attached to a static member so as to generate the encoded signal encp. A periodic pulse signal that emits a pulse every time the rotating shaft of the motor 12 rotates by a predetermined angle is obtained by performing waveform shaping of the encoded signal encp appropriately. When the motor 12 is the linear motor, the encoded signal encp that changes periodically in accordance with the movement position of the operating portion is obtained.

The installation position of the encoder 13 is not limited to the position on the rotating shaft of the motor. For example, when the motor 12 is the rotating motor, the encoder 13 may be installed on an operating shaft of a target that is driven by the motor 12. When the motor 12 is the linear motor, the slits may be arranged linearly. The encoder 13 may not be an optical unit configured by the slits and the light source and may detect rotation and movement of the motor 12 magnetically or by using another unit.

The configuration of the motor control apparatus 1 is described more in detail. The control unit 10 is a microcomputer, for example. The control unit 10 includes a central processing unit (CPU) 20, a memory 21, an interrupt unit 22, a counter 23, and a digital/analog (D/A) unit 24. The respective parts of the control unit 10 are connected to one another via a bus 25 in a communicable manner. The memory 21 includes a random access memory (RAM) and a read only memory (ROM). The ROM stores therein programs with which the CPU 20 operates.

The CPU 20 decodes program commands stored in the memory 21 sequentially so as to execute various processing including data transfer, operation processing, divaricating processing, and interrupt processing. In this case, the CPU 20 can use the RAM portion of the memory 21 as a work memory. The interrupt unit 22 issues an interrupt request int regularly at a predetermined cycle to the CPU 20.

The counter 23 counts pulses of the encoded signal encp that is output from the encoder 13 and outputs a count value ecnt. The D/A unit 24 converts a drive command signal ctl as a digital signal that has been output from the CPU 20 to a drive command signal dry as an analog signal and outputs it to the driver 11. The drive command signal dry may be voltage output or a PWM signal as described above.

The driver 11 functions as a driving control unit that performs driving control of the motor 12 in accordance with the drive command signal dry. When the drive command signal dry is the voltage output, the driver 11 outputs a higher driving voltage Vm as the voltage value of the drive command signal dry is higher, for example, and drives the motor 12 at a higher speed. On the other hand, when the drive command signal dry is the PWM signal, the driver 11 outputs a higher driving voltage Vm as a duty ratio of the PWM is higher, for example. Hereinafter, the drive command signal dry and the driving voltage Vm induce a drive command and motor driving with voltage values, respectively.

Figure 2:
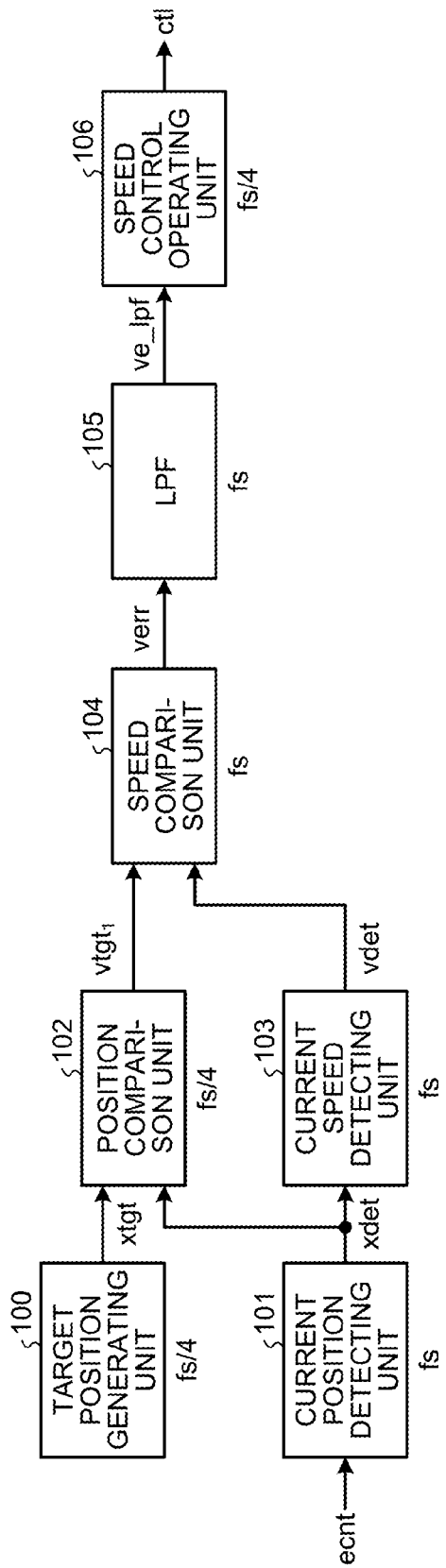
FIG. 2 is a functional block diagram for explaining functions of the motor control apparatus in the first embodiment.

FIG. 2 is a functional block diagram for explaining functions of the motor control apparatus 1 in the first embodiment. The respective parts in the functional block diagram are made to function with the programs operating on the CPU 20, for example. The motor control apparatus 1 includes a target position generating unit 100, a current position detecting unit 101, a position comparison unit 102, a current speed detecting unit 103, a speed comparison unit 104, a low-pass filter (LPF) 105, and a speed control operating unit 106.

The memory 21 stores therein motor control programs for executing the respective parts in FIG. 2 previously, for example. Alternatively, the motor control programs according to the respective embodiments and modifications may be configured to be provided by being recorded in a computer-readable recording medium, such as a compact disc (CD), a flexible disk (FD), or a digital versatile disk (DVD), in a format that can be installed or a file that can be executed.

Furthermore, the motor control programs according to the respective embodiments and modifications may be configured to be provided by being stored on a computer connected to a network such as the Internet and being downloaded through the network. Alternatively, the motor control programs according to the embodiments may be configured to be provided or distributed through a network such as the Internet.

For example, the motor control programs operating on the control unit 10 in the first embodiment have module configurations including the target position generating unit 100, the current position detecting unit 101, the position comparison unit 102, the current speed detecting unit 103, the speed comparison unit 104, the low-pass filter (LPF) 105, and the speed control operating unit 106 as described above. As actual hardware, the CPU 20 reads out the motor control programs from the memory 21 to execute them, so that the above-described respective parts are loaded on a main storage device (RAM portion of the memory 21) and are generated on the main storage device.

The flow of the signals with processing executed on the control unit 10 is described in detail with reference to FIG. 2. The flow of the signals as illustrated in FIG. 2 is generated when the interrupt unit 22 outputs the interrupt request int regularly to be executed.

In this example, when a sampling frequency of the encoded signal encp is set to a frequency fs, the target position generating unit 100, the position comparison unit 102, and the speed control operating unit 106 operate at a sampling frequency fs/4, and the current speed detecting unit 101, the current speed detecting unit 103, the speed comparison unit 104, and the LPF 105 operate at a sampling frequency fs. The sampling frequency fs is an inverse of a basic interrupt cycle (=1/fs) that is generated by the interrupt unit 24. Processing is executed every interrupt at the sampling frequency fs. Furthermore, processing is executed every four-time interrupts at the sampling frequency fs/4.

The target position generating unit 100 outputs a target position xtgt. The target position generating unit 100 may output a target movement amount as a movement amount to a target position instead of the target position xtgt. The target position generating unit 100 generates and outputs the target position xtgt with a command from a high-order device (not illustrated) and calculation in the target position generating unit 100. The target position xtgt may be output on a basis of a step at a constant interval or may be an amount that changes over time obtained by integrating a predetermined target speed profile.

The current position detecting unit 101 acquires a current rotating angle of the motor 12 based on a count value enct obtained by counting the pulses of the encoded signal encp by the counter 23 and outputs a current position xdet based on the rotating angle. The current position detecting unit 101 may read out the count value enct from the counter 23 directly. Alternatively, the current position detecting unit 101 may multiply the count value enct by a predetermined coefficient for converting the unit of the encoded signal encp to a predetermined physical unit. In this case, in order to ensure a sufficient operation word length and improve operation accuracy in an operation at a subsequent stage, the current position detecting unit 101 preferably multiplies the pulse unit of the encoded signal encp by a large coefficient.

In the first embodiment, the counter 23 configured by the hardware counts the count value enct. It is not limited thereto. When the interrupt processing is executed at an interrupt cycle that is sufficiently shorter than a pulse cycle of the encoded signal encp, the current position detecting unit 101 may read out a pulse theoretical value (0 or 1) in accordance with the pulses of the encoded signal encp directly. In this case, pulse edges are detected when there is change between the pulse theoretical value of the encoded signal encp that has been read out in the previous interrupt processing and the pulse theoretical value at this time. That is, it is sufficient that the count value ecnt is obtained based on the change in the pulse theoretical value.

The position comparison unit 102 compares the target position xtgt output from the target position generating unit 100 with the current position xdet output from the current position detecting unit 101. Then, the position comparison unit 102 multiplies the comparison result by a predetermined coefficient Gx in accordance with the following equation (1) and outputs a target speed $vtgt_1$. Hereinafter, respective equations are written in the C language that is generally used as a programming language unless otherwise specifically defined.

$$vtgt_1=(xtgt-xdet)*Gx; \quad (1)$$

Based on this, the target speed $vtgt_1$ is set to be larger as the deviation between the target position xtgt and the current position xdet is larger, and the motor 12 is driven such that the positional deviation is made smaller at a high speed. When the positional deviation becomes smaller, the target speed $vtgt_1$ is decreased, so that the current position reaches the target position xtgt smoothly.

The current speed detecting unit 103 obtains a difference between the current positions xdet at a predetermined cycle so as to calculate a current speed vdet. Preferably, the current speed detecting unit 103 obtains a difference between the current position xdet and a current position z_xdet one cycle before at the interrupt cycle. Then, the current speed detecting unit 103 multiplies the difference by a predetermined coefficient Gv so as to obtain the current speed vdet.

For example, the current speed detecting unit 103 performs an operation of the following equation (2) at the interrupt cycle. In the following respective equations, a number partitioned by a colon ":" at the head of each line indicates a line number for distinguishing respective lines of an equation formed by a plurality of lines. When the line number is given, a plurality of lines form one equation.

```
1: vdet=(xdet₀-xdet₁)*Gv;

2: z_xdet=xdet;                                    (2)
```

As described above, when the pulses of the encoded signal encp are counted by software, the change of the pulse theoretical value is detected. Actually, the following method is employed easily. That is, the detected change of the pulse theoretical value is considered as the current speed vdet and the current speed vdet is integrated so as to obtain the current position xdet.

For example, when the current position detecting unit 101 and the current speed detecting unit 103 read out pulses of the encoded signal encp at the interrupt cycle, they obtain the current position xdet and the current speed vdet by using the following equation (3), respectively. In the equation (3), a reference symbol "!=" is a conditional operator indicating that both sides are not equal.

```
1:  if (encp ! = z_encp) {
2:    vdet = 1;
3:  }
4:  else {
5:    vdet = 0;
6:  }
7:  xdet = xdet + vdet;
8:  vdet = vdet * Gv;
9:  z_encp = encp;                                 (3)
```

In the equation (3), the first line and the second line indicate that when there is change from the previous encoded signal encp, the current speed vdet is set to 1. The fourth line and the fifth line indicate that when the encoded signal encp is not changed, the current speed vdet is set to 0. The seventh line indicates that the current speed vdet is integrated to obtain the current position xdet. The eighth line indicates that the current speed vdet is multiplied by the predetermined coefficient Gv. Furthermore, the ninth line indicates that the previous encoded signal encp is updated.

The equation (3) indicates a program example for counting both the edges (both the rising and trailing edges) of the encoded signal encp so as to obtain the current position xdet, and setting derivation of the current position xdet, that is, the difference between the current positions xdet for each interrupt cycle to the current speed vdet. The current position detecting unit 101 and the current speed detecting unit 103 can be configured without using the counter 23 by hardware by performing processing in accordance with the program. This case can reduce the cost of the apparatus in comparison with the case where the counter 23 by the hardware is provided.

The description is returned back to FIG. 2. The speed comparison unit 104 compares the target speed $vtgt_1$ with the current speed vdet and outputs a speed error verr in accordance with the following equation (4) based on the comparison result.

$$verr=vtgt_1-vdet; \quad (4)$$

The low-pass filter (LPF) 105 performs a filter operation of passing a low-frequency component of the speed error verr. The LPF 105 can be designed by using the existing signal processing theory.

Figure 3:
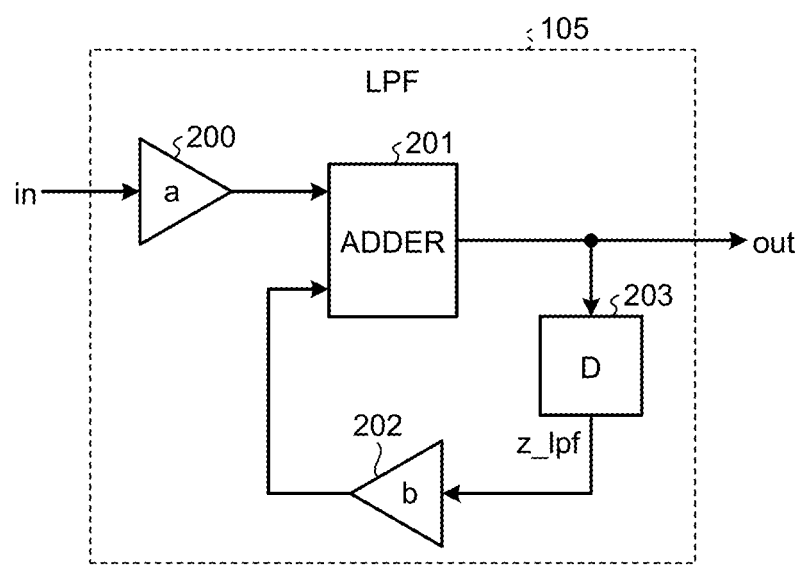
FIG. 3 is a block diagram illustrating an example of the configuration of a low-pass filter (LPF) in the first embodiment.

FIG. 3 illustrates an example of the configuration of the LPF 105 in the first embodiment. In this example, the LPF 105 includes coefficient multipliers 200 and 202, an adder 201, and a delay unit 203, and constitutes a primary LPF. The LPF 105 as illustrated in FIG. 3 performs low-pass filter processing on a signal input as input in and outputs it as output out. In the first embodiment, the speed error verr that is output from the speed comparison unit 104 is input as input in to the LPF 105 and a signal ve_lpf obtained by performing the low-pass filter processing on the speed error verr is output to the speed control operating unit 106 as the output out.

Furthermore, the coefficient multipliers 200 and 202 multiply the input signal by coefficients a and b, respectively. The coefficients a and b can be obtained easily by using the existing signal processing theory when a cutoff frequency and the sampling frequency fs of the LPF 105 are given. The adder 201 adds outputs of the coefficient multipliers 200 and 202 and outputs it as the signal ve_lpf. The delay unit 203 is a memory and stores therein a value obtained in the previous operation (interrupt cycle).

The LPF 105 performs an operation in accordance with the following equation (5), and performs the low-pass filter processing on the signal input as the input in. The processing in accordance with the equation (5) is preferably executed at the interrupt cycle (=1/fs). It should be noted that in the equation (5), a variable z_lpf is a memory variable indicating a value stored in the memory 203.

1: out=in*a+z_lpf*b

2: z_lpf=out     (5)

In the equation (5), calculation from the input in to the output out is made in the first line. Then, the output out at this time is substituted into the memory variable z_lpf for the subsequent calculation in the second line.

The description is returned back to FIG. 2. The speed control operating unit 106 performs error amplification operation processing on the speed error verr so as to generate a motor drive command signal ctl for controlling the rotating speed of the motor 12. The speed control operating unit 106 preferably performs the error amplification operation by using a proportional-integral-derivative (PID) controller method, for example. The speed control operating unit 106 performs the error amplification operation by the PID operation in accordance with the following equation (6) once every time the interrupt processing is executed predetermined number of times, for example, at a cycle (sampling frequency fs/4) of once for four-time interrupts. In the equation (6), values Gp, Gi, and Gd indicate a proportional gain, an integral gain, and a derivative gain, respectively.

1: p=verr*Gp;

2: i=i+verr*Gi;

3: d=(verr−z_verr)*Gd;

4: ctl=p+i+d;

5: z_verr=verr;     (6)

In the equation (6), the speed error verr is multiplied by the proportional gain Gp in the first line. The speed error verr is multiplied by the integral gain Gi so as to perform integration in the second line. A difference between the previous speed error z_verr and the speed error verr is multiplied by the derivative gain Gd in the third line. The results of the first to third lines, that is, the proportional component, the integral component, and the derivative component are added so as to generate the motor drive command signal ctl as control output in the fourth line. Furthermore, a speed error z_verr for the derivative operation in the third line at the subsequent time is updated in the fifth line.

The speed operation control unit 106 controls such that the speed error is set to 0 while ensuring a sufficiently large amplification rate by the integration in a low-frequency band by the PID operation in the equation (6). Furthermore, in a high-frequency band, current phase delay and the like of the motor coil are compensated by the derivation so as to make stabilization. Thus, the speed operation control unit 106 using the PID operation executes speed control processing based on existing findings of the control theory.

Figure 4:
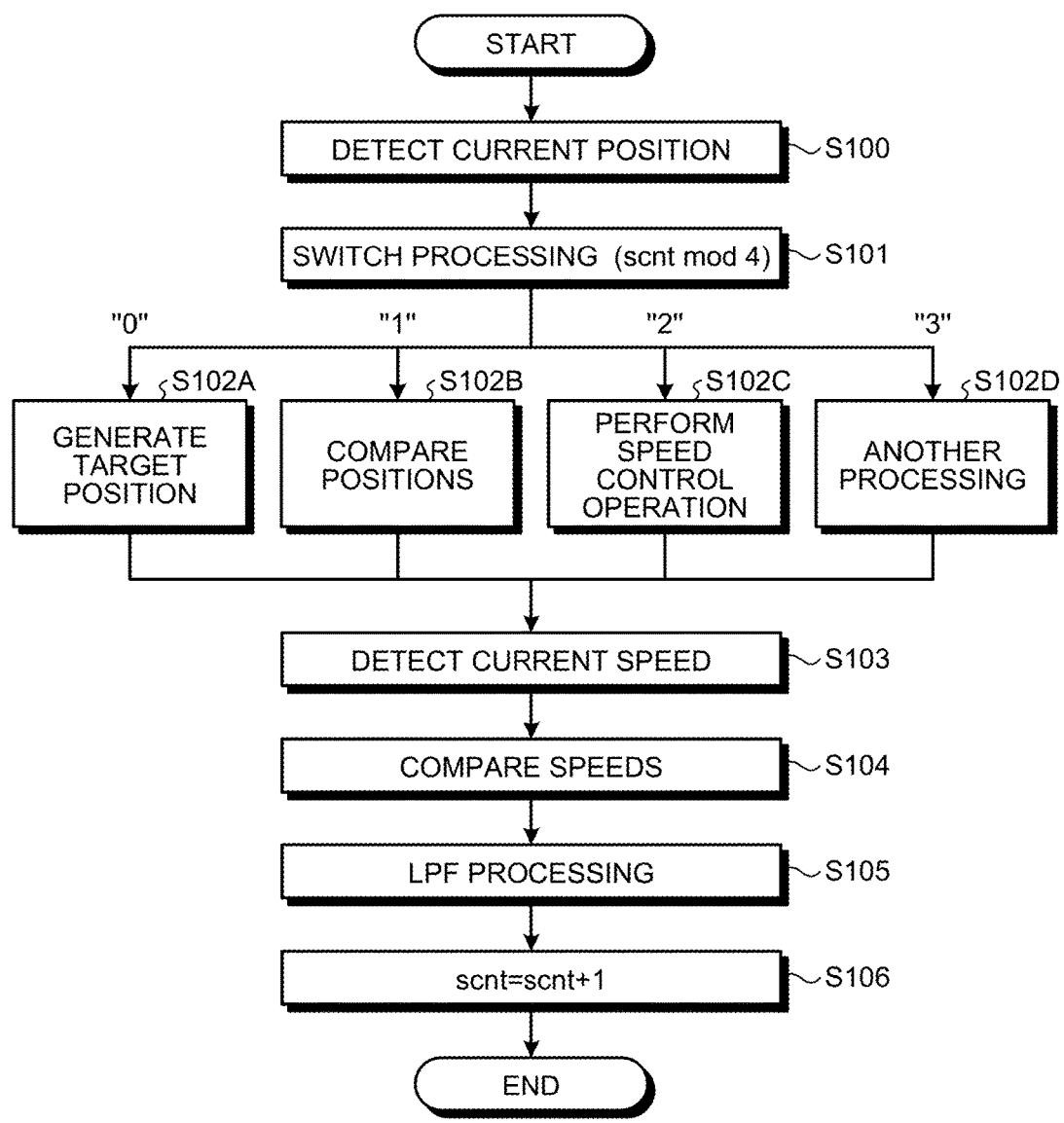
FIG. 4 is a flowchart illustrating an example of interrupt processing in the first embodiment.

FIG. 4 is a flowchart illustrating an example of the interrupt processing in the first embodiment. The interrupt is generated by the interrupt unit 22 of the control unit 10 at a predetermined cycle and is executed by branching to an interrupt entry.

In FIG. 4, the control unit 10 detects the current position xdet by the current position detecting unit 101 at step S100. At subsequent step S101, the control unit 10 determines a count variable scnt and causes the process to branch in accordance with the determination result. In this example, the control unit 10 causes the process to branch into any of steps S102A to S102D that are pieces of second processing in accordance with a residue (mod) obtained by dividing the count variable scnt by 4.

When the control unit 10 determines that the residue is 0, the process proceeds to step S102A and the target position generating unit 100 generates the target position xtgt. When the control unit 10 determines that the residue is 1, the process proceeds to step S102B and the position comparison unit 102 compares the target position xtgt with the current position xdet and outputs the target speed $vtgt_1$. When the control unit 10 determines that the residue is 2, the process proceeds to step S102C and the speed control operating unit 106 performs the speed control operation so as to generate the motor drive command signal ctl. When the control unit 10 determines that the residue is 3, the process proceeds to step S102D. In the first embodiment, processing at step S102D is reserved.

One of a plurality of different pieces of processing at steps S102A to S102D that are the pieces of second processing is selected in accordance with the residue obtained by dividing the count variable scnt by 4 at step S101. A series of the pieces of second processing are executed once by executing overall the process in the flowchart in FIG. 4 four times. Accordingly, the pieces of second processing are a group of pieces of processing that are executed at the sampling frequency fs/4 for the interrupt cycle 1/fs.

When the processing in accordance with the residue value among steps S102A to S102D is finished, the process proceeds to step S103. At step S103, the control unit 10 detects the current speed vdet by the current speed detecting unit 103. At subsequent step S104, the control unit 10 compares the target speed $vtgt_1$ with the current speed vdet by the speed comparison unit 104, and outputs the speed error verr as a comparison result. At subsequent step S105, the control unit 10 performs the low-pass filter processing on the speed error verr by the LPF 105. Then, at subsequent step S106, the control unit 10 increments the count variable scnt by 1 and the process in the flowchart in FIG. 4 is finished.

The above-mentioned series of the pieces of second processing are executed by executing the process in the flowchart four times whereas the pieces of processing at step S100, and steps S103 to S106 are executed every time the process in the flowchart is executed. The pieces of processing at step S100, and steps S103 to S106 that are executed every time the process in the flowchart is executed are referred to as first processing.

The different processing as the second processing is executed every time the process in the flowchart is executed, so that an execution time is different for each execution of the process in the flowchart. Accordingly, a start timing of the subsequent processing is different each time and it is difficult to execute speed detection and position detection accurately.

In order to cope with this, in the flowchart in FIG. 4, at least the detection processing of the current position xdet by the current position detecting unit 101 among the first processing is executed before each of the pieces of second processing. This enables the start timing of the processing by the current position detecting unit 101 with respect to the start of the interrupt processing to be constant for each execution of the process in the flowchart. This can detect the current position xdet accurately.

Furthermore, also when the pulses of the encoded signal encp are not counted by using the counter 23 and the current position detecting unit 101 performs sampling of the theoretical value of the encoded signal encp at an interrupt timing on the control unit 10 so as to count the pulses of the encoded signal encp, the sampling interval is not changed so as to cope with a high-speed rotating speed of the motor 12. In this case, the pulses are not counted by using the hardware, thereby suppressing the cost of circuits and parts to be low.

Figure 5:
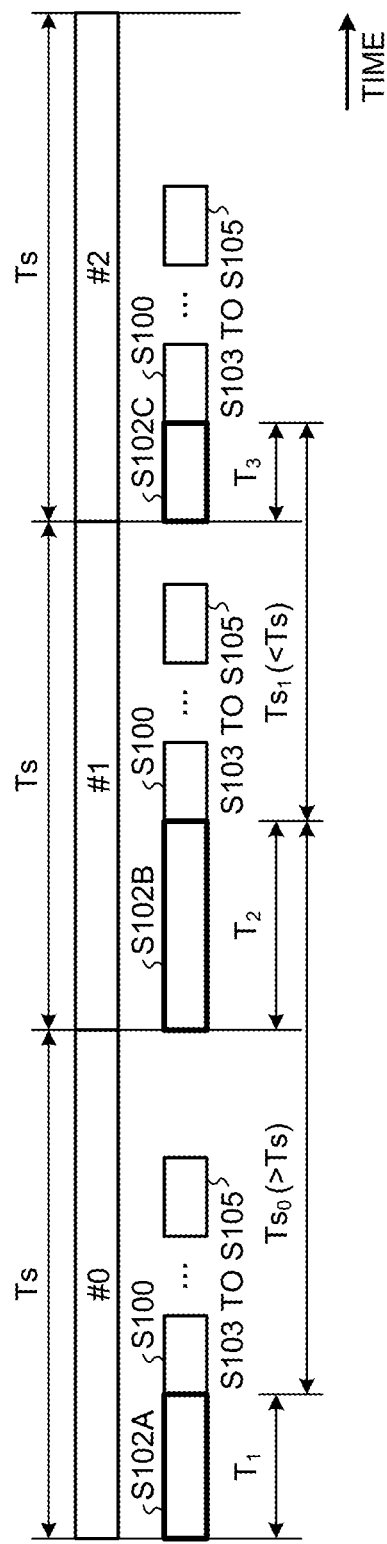
FIG. 5 is a chart illustrating an example when all pieces of processing of first processing are executed after second processing is executed in the first embodiment.
Figure 6:
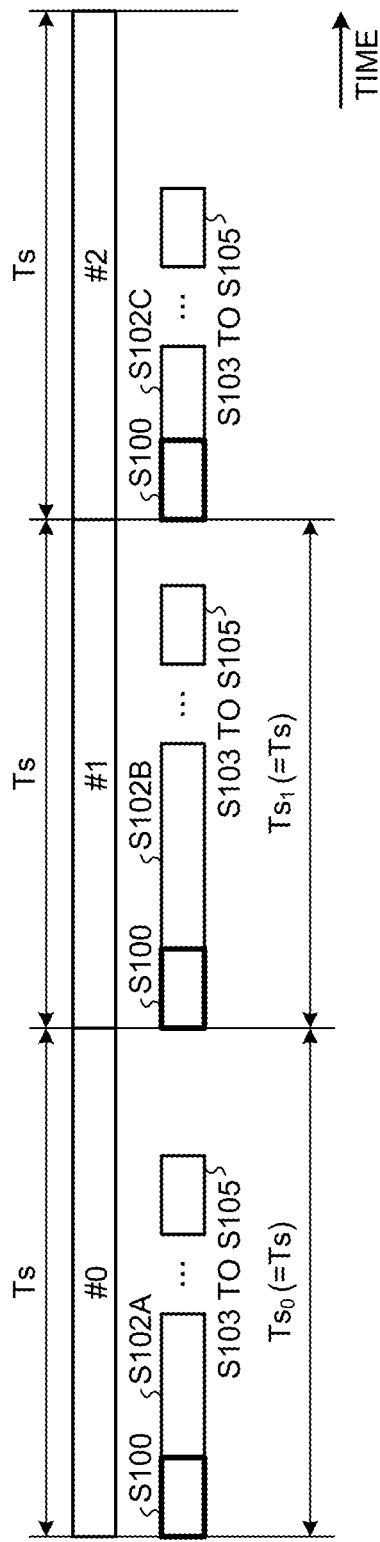
FIG. 6 is a chart illustrating an example when at least current position detection processing among the first processing is executed at the head of the interrupt processing in the first embodiment.

Described is the difference between the case where each second processing is executed before the first processing and the case where at least a part of the first processing is executed before each second processing more in detail with reference to FIG. 5 and FIG. 6. In FIG. 5 and FIG. 6, the same reference numerals denote the pieces of processing corresponding to those in the above-mentioned flowchart in FIG. 4, and detail description thereof is omitted. In FIG. 5 and FIG. 6, a cycle Is indicates the interrupt cycle.

FIG. 5 illustrates an example when all pieces of processing of first processing are executed after each second processing is executed. In the example of FIG. 5, the processing at step S102A as the second processing is executed at the head of a cycle #0 for a time $T_1$. The processing at step S102B as the second processing is executed at the head of a cycle #1 for a time $T_2$. The processing at step S102C as the second processing is executed at the head of a cycle #2 for a time $T_3$. Furthermore, the processing at step S100 and the processing at steps S103 to S105 that are the pieces of the first processing are executed subsequent to the processing at step S102A, step S102B, or step S102C in each of the cycles #0 to #2.

The processing at step S102A, step S102B, and step S102C that is the pieces of the second processing are different from one another, so that the time $T_1$, the time $T_2$, and the time $T_3$ are also different from one another. That is, the termination timings of the pieces of second processing, that is, the start timings of the pieces of first processing are different from one another among the respective cycles #0 to #2. For this reason, sampling cycles $Ts_0$ and $Ts_1$ of the current position xdet by the current position detecting unit 101 at step S100 that is executed at the head of the pieces of first processing are different from the interrupt cycle Ts.

FIG. 6 illustrates an example when at least the detection processing of the current position xdet by the current position detecting unit 101 at step S100 among the first processing is executed at the head of the interrupt processing in the first embodiment. In the example of FIG. 6, each second processing is executed after the processing at step S100 that is included in the first processing. In this case, the processing at S100 that is the same processing for each interrupt cycle is executed at the head, so that the respective sampling cycles $Ts_0$ and $Ts_1$ at step S100 are equal to the interrupt cycle Ts in each interrupt cycle. This can execute the sampling by the current position detecting unit 101 accurately.

In the first embodiment, as described above, the first processing in which the same pieces of processing are executed in each interrupt processing, and the second processing in which A different piece of processing from the second processing is executed in each interrupt processing, are provided. The following four pieces of processing i to vi are assigned as the pieces of first processing.

i. Detection processing of the current position xdet by the current position detecting unit 101.

ii. Detection processing of the current speed vdet by the current speed detecting unit 103.

iii. Comparison processing between the target speed $vtgt_1$ and the current speed vtgt by the speed comparison unit 104.

iv. Low-pass filter processing on the speed error verr by the LPF.

In general, the detection of the current position and the current speed requires high-speed processing in a speed control loop. For this reason, the detection is executed every interrupt, thereby achieving high-speed control with high accuracy.

On the other hand, the following three pieces of processing v to vii are assigned as the pieces of second processing.

v. Generation processing of the target position xtgt by the target position generating unit 100.

vi. Comparison processing between the target position xtgt and the current position xdet by the position comparison unit 102.

vii. Speed control operation processing by the speed operation control unit 106.

These pieces of processing assigned as the pieces of second processing do not give an influence on control performance even when they are performed at a relatively low speed. That is, each of the pieces of second processing is executed once per four-time interrupt sequentially, for example. This makes it possible to employ, as the control unit 10, a microcomputer at low cost by using the CPU having relatively low processing performance.

That is to say, when the CPU having low processing performance is used for control, if all the pieces of processing are executed every time the interrupt processing is executed, there is a possibility that the pieces of processing are not completed in the interrupt cycle. This arises a risk that the control processing fails. In the first embodiment, the pieces of processing that do not require high-speed property among the pieces of processing relating to the control are performed in a divided manner into a plurality of interrupt cycles. This prevents the control as a whole from failing, thereby avoiding lowering of the control performance.

Furthermore, the LPF 105 performs the low-pass filter processing on the speed error verr output from the speed comparison unit 104. This suppresses noise due to the current speed vdet, thereby achieving control with higher accuracy. The low-pass filter processing by the LPF 105 at step S105 is set to be executed every time the interrupt processing is executed. With this, even when the motor 12 is made to rotate at the high speed, speed control with high accuracy can be performed.

The assignment of the pieces of processing i to vii to the first processing and the second processing is not limited to the above-mentioned example. For example, the generation processing of the target position xtgt by the target position generating unit 100 in the processing v assigned to the second processing in the above-mentioned example may be assigned to the first processing. Also in this case, at least the detection processing of the current position xdet by the current position detecting unit 101 in the processing i is assigned to the first processing. Furthermore, at least the speed control operation processing by the speed operation control unit 106 in the processing vii is assigned to the second processing.

Modification of First Embodiment

Next, a modification of the first embodiment is described. Although only the current position detection processing by the current position detecting unit 101 among the first processing is executed before each second processing in the above-mentioned first embodiment, it is not limited thereto. That is to say, all the pieces of processing (step S100, and steps S5103 to S106) included in the first processing may be executed before each piece of the second processing.

Figure 7:
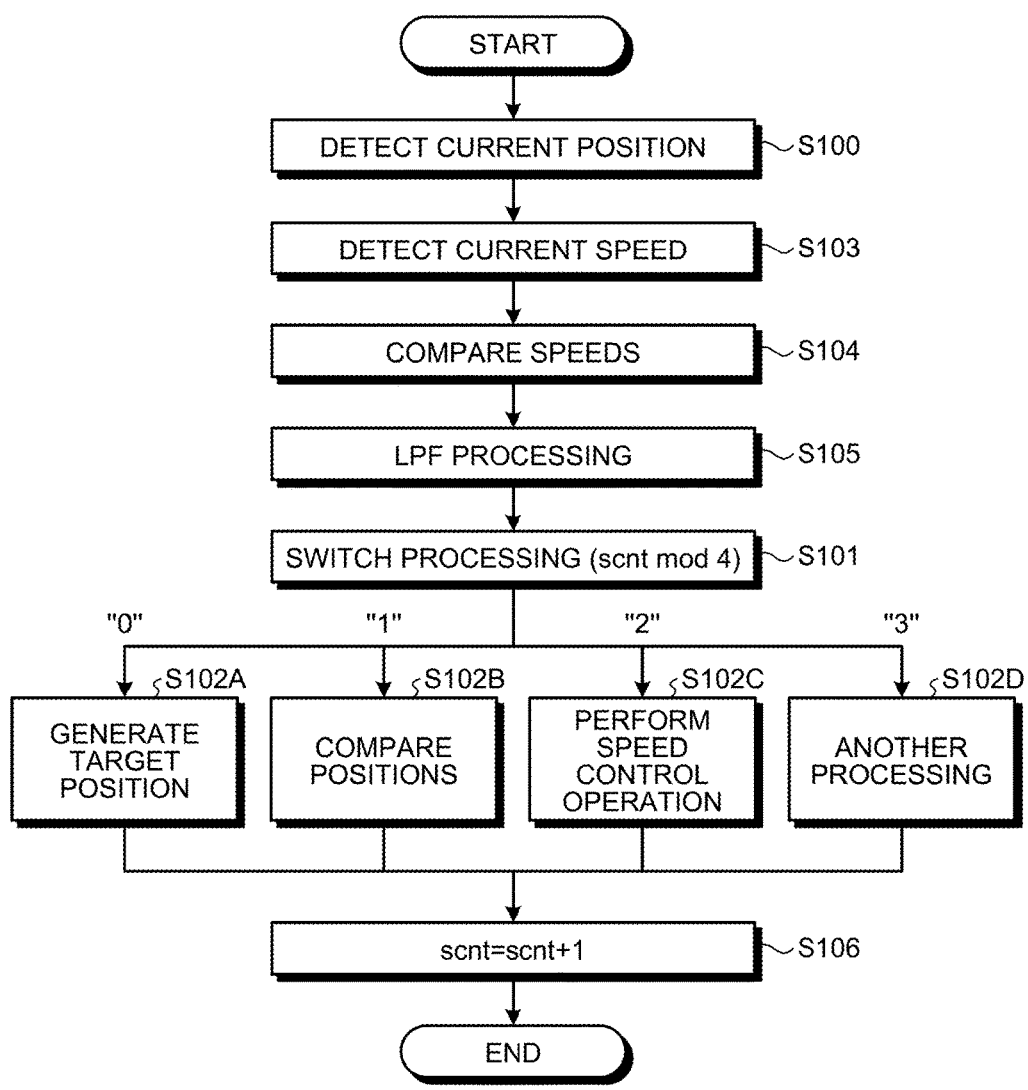
FIG. 7 is a flowchart illustrating an example of interrupt processing according to a modification of the first embodiment.

FIG. 7 is a flowchart illustrating an example of interrupt processing according to the modification of the first embodiment. In FIG. 7, the same reference numerals denote pieces of processing common to the pieces of processing in the above-mentioned flowchart in FIG. 4, and detail description thereof is omitted. In the modification of the first embodiment, the configuration of the motor control apparatus 1 according to the first embodiment as described above with reference to FIG. 1 can be applied as it is, and the functional block diagram illustrating the functions of the motor control apparatus 1 as described above with reference to FIG. 2 can be also applied as it is.

As illustrated in FIG. 7, in the modification of the first embodiment, the control unit 10 executes the pieces of first processing at step S100, and steps S103 to step S106 continuously, and then, selects and executes one of the pieces of second processing at step S101. After the second processing is finished, the control unit 10 increments the count variable scnt by 1.

Thus, when each second processing is executed after all the pieces of first processing are finished, start timings of the detection processing of the current speed vdet by the current speed detecting unit 103 and the comparison processing between the target speed vtgt$_1$ and the current speed vdet by the speed comparison unit 104 among the pieces of first processing are not deviated. This enables the control unit 10 to execute driving control of the motor 12 more accurately.

Second Embodiment

Figure 8:
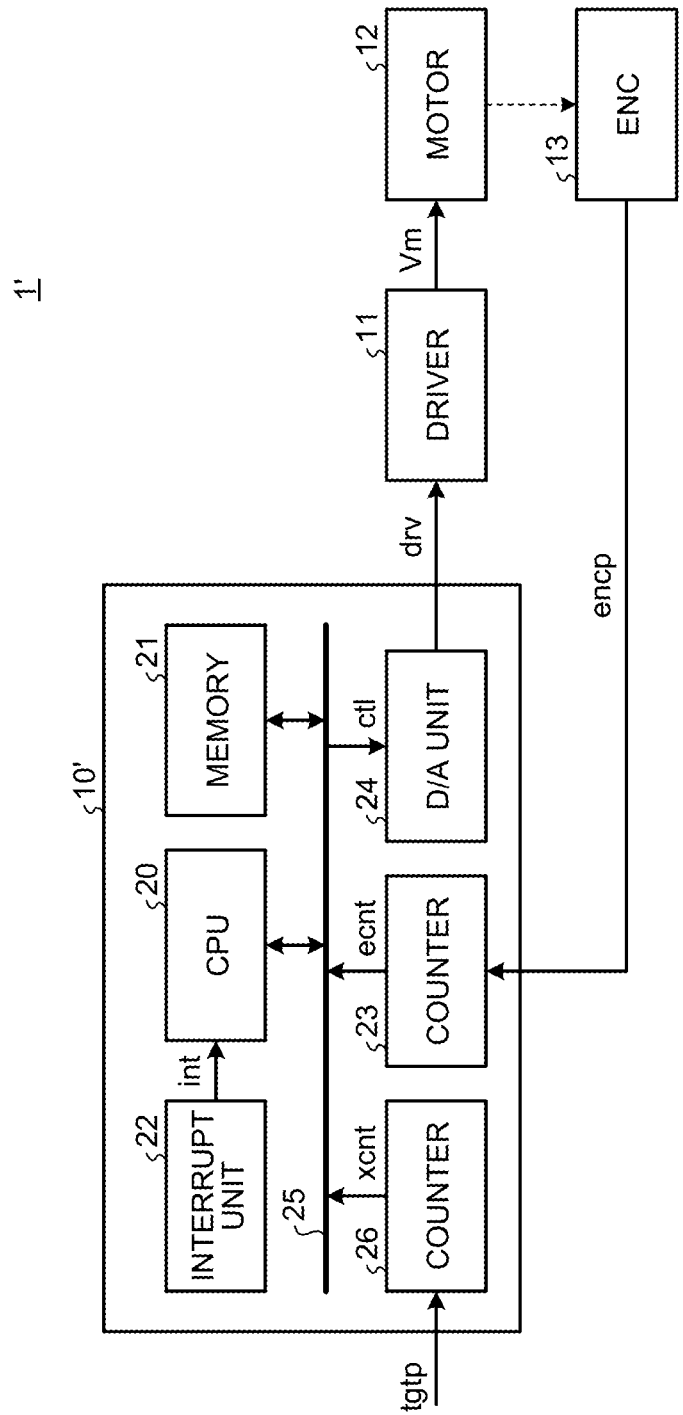
FIG. 8 is a block diagram illustrating an example of the configuration of a motor control apparatus according to a second embodiment.

Next, described is a second embodiment. FIG. 8 illustrates an example of the configuration of a motor control apparatus 1' according to the second embodiment. It should be noted that in FIG. 8, the same reference numerals denote the parts common to those in FIG. 1 as described above and detail description thereof is omitted.

In the motor control apparatus 1' in FIG. 8, a counter 26 is added to the above-mentioned motor control apparatus 1 in FIG. 1. The counter 26 counts a target pulse signal tgtp from the outside and outputs a count value xcnt. The target pulse signal tgtp is supplied from a high-order device of the motor control apparatus 1 for example.

Figure 9:
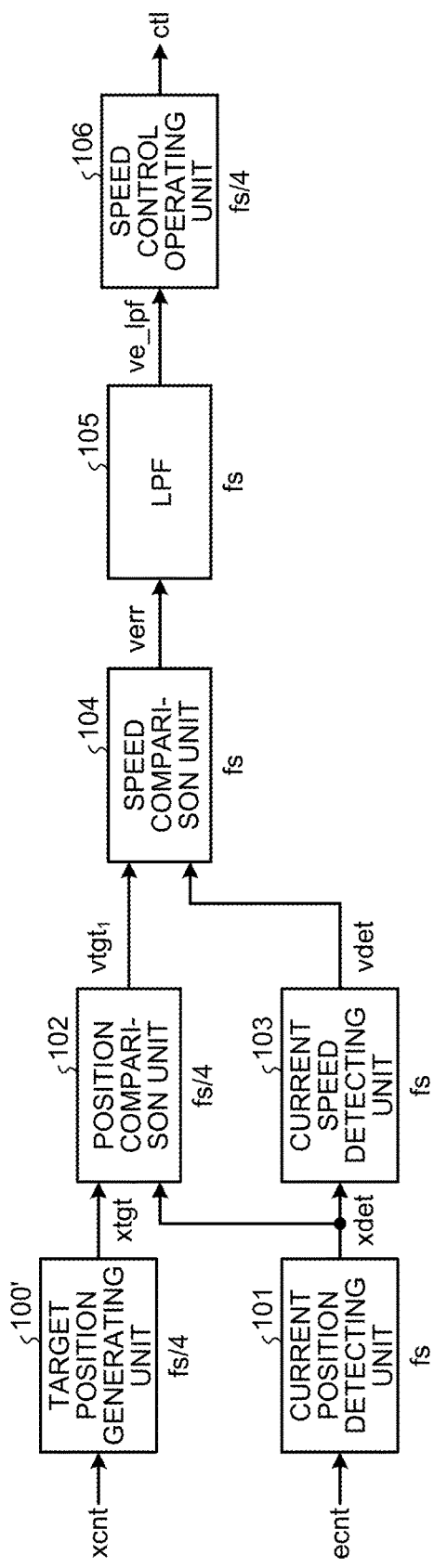
FIG. 9 is a functional block diagram for explaining functions of the motor control apparatus in the second embodiment.

FIG. 9 is a functional block diagram for explaining functions of the motor control apparatus 1' in the second embodiment. In FIG. 9, a target position generating unit 100' corresponds to the target position generating unit 100' in FIG. 2. The target position generating unit 100' is different from the target position generating unit 100' in FIG. 2 in a point that it generates the target position xtgt based on the count value xcnt output from the counter 26. In this case, the target position generating unit 100' performs sampling of the count value xcnt at the sampling frequency fs/4. That is to say, it is sufficient that the target position generating unit 100' performs the processing only once for four-time interrupt processing.

In the second embodiment, when the target pulse signal tgtp is input from the outside so as to generate the target position xtgt, the rotating position of the motor 12 can be controlled in accordance with the target position xtgt.

Figure 10:
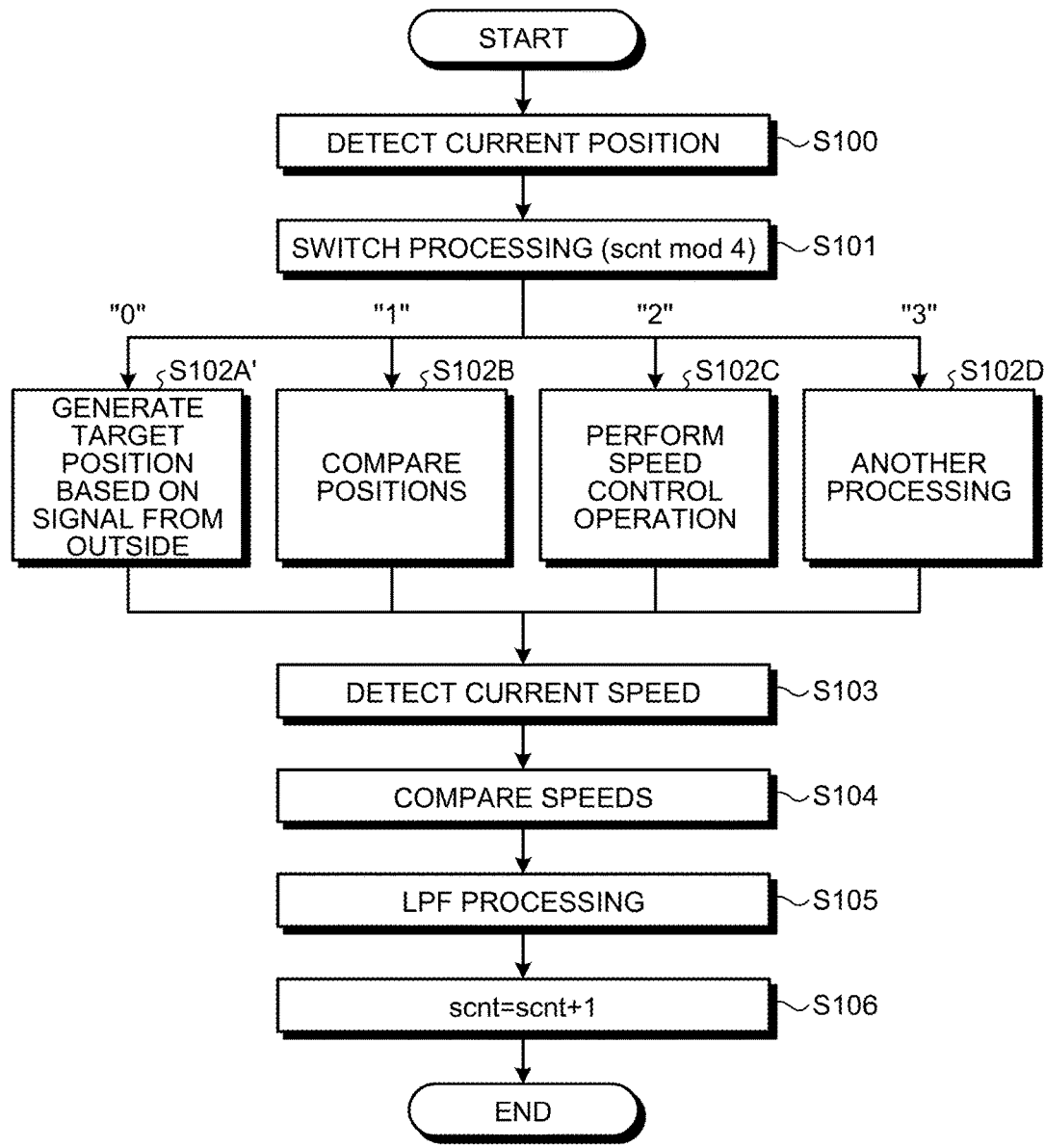
FIG. 10 is a flowchart illustrating an example of interrupt processing in the second embodiment.

FIG. 10 is a flowchart illustrating an example of interrupt processing in the second embodiment. In FIG. 10, the same reference numerals denote the pieces of processing common to those in the above-mentioned pieces of processing in the flowchart in FIG. 4 and detail description thereof is omitted.

As illustrated in FIG. 10, in the interrupt processing in the second embodiment, the processing at step S102A in the processing in the first embodiment as illustrated in FIG. 4 corresponds to step S102A'. The processing at step S102A' is processing of generating the target position xtgt based on the count value xcnt obtained by counting the target pulse signal tgtp from the outside that is performed by the target position generating unit 100'. Other pieces of processing in the flowchart as illustrated in FIG. 10 are common to the corresponding pieces of processing in the flowchart in FIG. 4.

Thus, in the second embodiment, the rotating position of the motor 12 can be controlled in accordance with the target pulse signal tgtp input from the outside.

Third Embodiment

Figure 11:
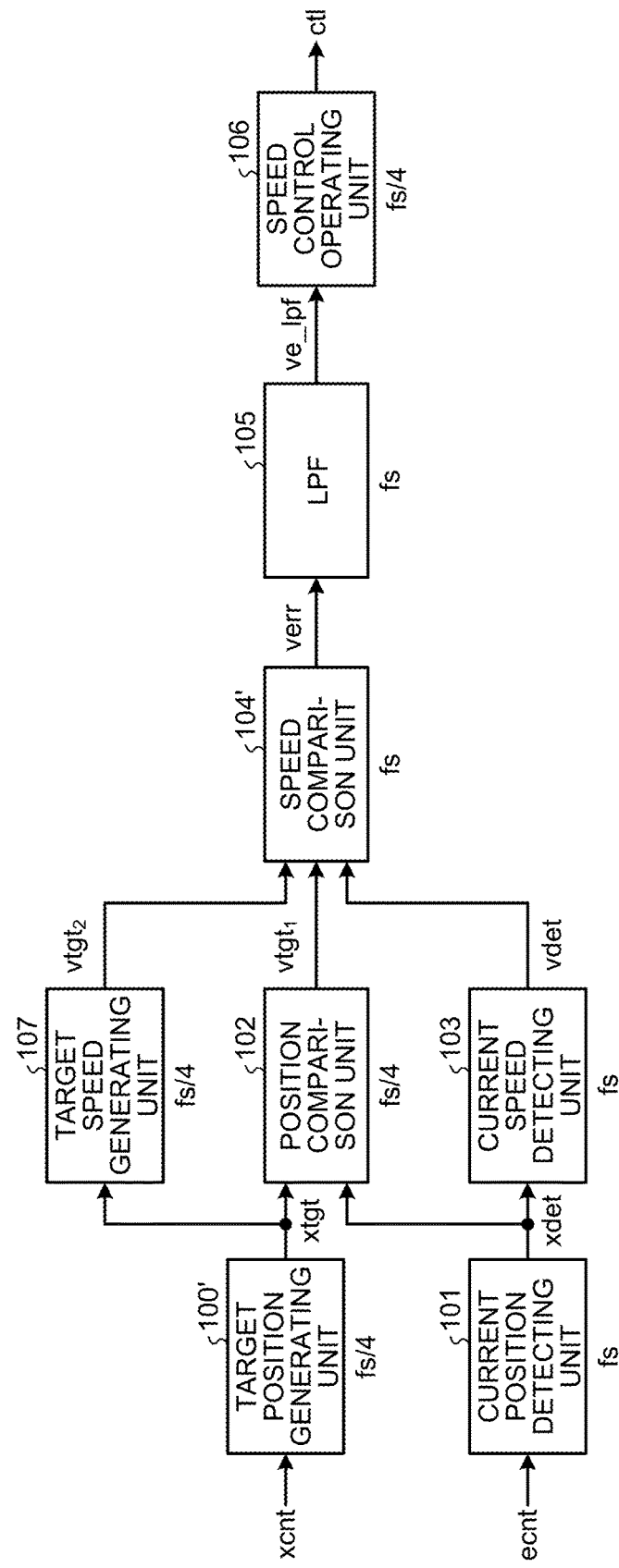
FIG. 11 is a functional block diagram for explaining functions of a motor control apparatus according to a third embodiment.

Next, described is a third embodiment. FIG. 11 is a functional block diagram for explaining the functions of a motor control apparatus 1' in the third embodiment. In the third embodiment, the configuration of the motor control apparatus 1' in the second embodiment as described above with reference to FIG. 8 can be applied as it is. Furthermore, in FIG. 11, the same reference numerals denote the parts common to those in FIG. 9 as described above and detail description thereof is omitted.

As illustrated in FIG. 11, in the third embodiment, a target speed generation unit 107 is added to the configuration in the above-mentioned second embodiment. The target speed generation unit 107 derives the target position xtgt generated on the target position generating unit 100' based on the count value xcnt obtained by counting the target pulse signal tgtp from the outside so as to generate a target speed vtgt$_2$. To be more specific, the target speed generation unit 107 generates the target speed vtgt$_2$ based on a difference between the target position xtgt in the interrupt processing at this time and the target position z_xtgt in the interrupt processing at the previous time.

The unit of the target speed vtgt$_2$ is preferably set to the same as that of the current speed vdet that is output from the current speed detecting unit 103. The current speed detecting unit 103 generates the current speed vdet from the positional difference that is obtained every time the interrupt processing is executed, that is, at a cycle of the sampling frequency fs. On the other hand, the target speed generation unit 107 operates once per four-time interrupt processing, that is, at the sampling frequency fs/4 so as to generate the target speed vtgt$_2$. Based on this, it is preferable that the target speed generation unit 107 generate the target speed vtgt$_2$ by using a coefficient obtained by quartering the coefficient Gv that is used when the current speed detecting unit 103 generates the current speed vdet as indicated in the equation (3). This makes the units of the target speed vtgt$_2$ and the current speed vdet be the same easily.

For example, the target speed generation unit 107 performs an operation of the following equation (7) once per four-time interrupt cycles.

$$1: vtgt_2 = (xtgt - z\_xtgt) * Gv/4;$$

$$2: z\_xtgt = xtgt \qquad (7)$$

In the equation (7), in the first line, a difference between the target position z_xtgt at the previous time and the target position xtgt at the this time that have been generated by the target position generating unit 100' based on the count value xcnt of the target pulse signal tgtp from the outside is obtained and the obtained difference is multiplied by the coefficient Gv/4. In the second line, the target position z_xtgt at the previous time is updated by the target position xtgt at this time.

The target speed generation unit 107 outputs the generated target speed $vtgt_2$ to a speed comparison unit 104'. The speed comparison unit 104' obtains the speed error verr in the following manner as indicated by the following equation (8). That is, the speed comparison unit 104' adds the target speed $vtgt_2$ and the target speed $vtgt_1$ output from the position comparison unit 102 so as to obtain a target speed $vtgt_{12}$. Then, the speed comparison unit 104' compares the target speed $vtgt_{12}$ with the current speed vdet output from the current speed detecting unit 103 so as to obtain the speed error verr.

$$verr = vtgt_1 + vtgt_2 - vdet; \qquad (8)$$

The speed comparison unit 104' adds the target speed $vtgt_1$ and the target speed $vtgt_2$. When the motor 12 rotates at a constant speed, the target speed $vtgt_2$ and the current speed vdet keep a balanced state. When there is no other disturbance, the target speed $vtgt_1$ stays at around 0. Accordingly, positional deviation (=xtgt−xdet) when the target speed $vtgt_1$ is generated also stays at around 0 so as to perform control corresponding to the target position xtgt with high accuracy. This can achieve precise positional control.

Figure 12:
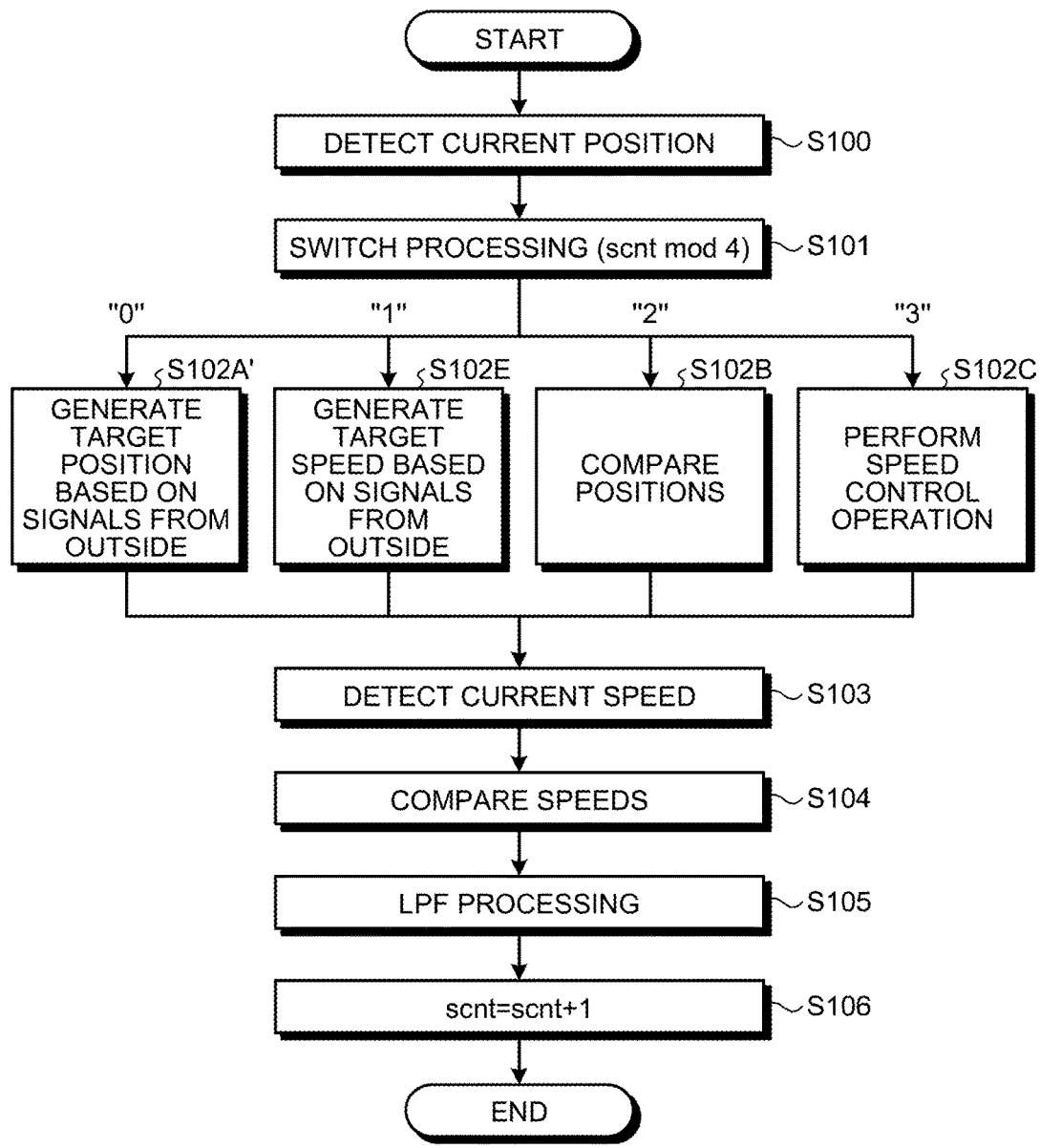
FIG. 12 is a flowchart illustrating an example of interrupt processing in the third embodiment.

FIG. 12 is a flowchart illustrating an example of interrupt processing in the third embodiment. In FIG. 12, the same reference numerals denote the pieces of processing common to those in the above-mentioned flowchart in FIG. 10, and detail description thereof is omitted.

As illustrated in FIG. 12, in the interrupt processing in the third embodiment, target speed generation processing based on the count value xcnt of the target pulse signal tgtp from the outside at step S102E is inserted as one of the pieces of processing into which the process branches in accordance with the residue of the count variable scnt at step S101. The control unit 10 performs generation processing of the target speed $vtgt_2$ by the target speed generation unit 107 at step S102E.

In the flowchart in FIG. 12, the processing at step S102E is inserted as processing that is performed when the residue of the count variable scnt is 1. The pieces of processing at step S102B and step S102C that are the pieces of processing performed when the residue is 1 and 2, respectively, in the flowchart in FIG. 10 are changed to pieces of processing that are performed when the residue is 2 and 3, respectively. In the flowchart in FIG. 12, "another processing" at step S102D as illustrated in FIG. 10 are deleted.

The processing at step S104 in the flowchart in FIG. 12 is processing of comparing a value obtained by adding the target speeds $vtgt_1$ and $vtgt_2$ with the current speed vdet that is performed by the speed comparison unit 104'.

FIG. 13 illustrates an example of an execution schedule of the interrupt processing in the third embodiment. In FIG. 13, the pieces of processing as indicated in the respective rows are as follows from the top:

a. Generation processing of the target position xtgt at step S102A',
b. Generation processing of the target speed $vtgt_2$ at step S102E,
c. Detection processing of the current position xdet at step S100,
d. Detection processing of the current speed vdet at step S103,
e. Comparison processing between the target position xtgt and the current position xdet at step S102B,
f. Comparison processing between the added result of the target speeds $vtgt_1$ and $vtgt_2$ and the current speed vdet at step S104,
g. Low-pass filter processing at step S105, and
h. Operation processing at step S102C.

In FIG. 13, each column indicates a value of the count variable scnt, and a residue obtained by dividing the count variable scnt by 4 is indicated on a lower portion of each column. Furthermore, in FIG. 13, a reference symbol "*" indicates processing of each row that is executed for each count variable scnt.

As illustrated in FIG. 13, the processing order of the respective pieces of processing is the same as that when the pieces of processing in the flowchart in FIG. 12 are executed by an interrupt each time. Although illustration and detail description are omitted, the same holds true for other embodiments and modifications of the embodiments.

Fourth Embodiment

Figure 14:
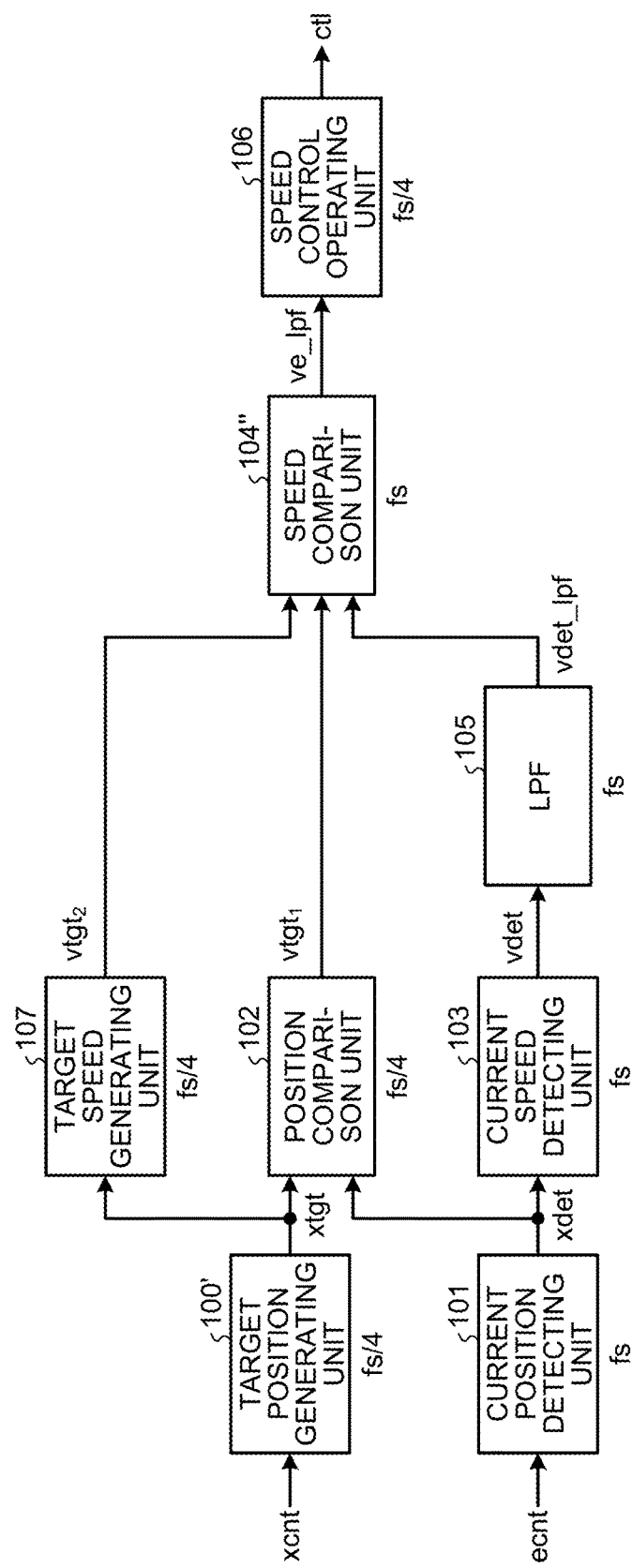
FIG. 14 is a functional block diagram for explaining functions of a motor control apparatus according to a fourth embodiment.

Next, described is a fourth embodiment. FIG. 14 is a functional block diagram for explaining functions of a motor control apparatus 1' in the fourth embodiment. In the fourth embodiment, the configuration of the motor control apparatus 1' in the second embodiment as described with reference to FIG. 8 can be applied as it is. In FIG. 14, the same reference numerals denote the parts common to those in FIG. 11 as described above and detail description thereof is omitted.

In the above-mentioned third embodiment, the LPF 105 is arranged at the subsequent stage of the speed comparison unit 104'. In contrary, in the fourth embodiment, the LPF 105 is arranged at the previous stage of a speed comparison unit 104".

To be more specific, as illustrated in FIG. 14, the motor control apparatus 1' in the fourth embodiment includes the LPF 105 between the current speed detecting unit 103 and the speed comparison unit 104". The speed comparison unit 104" compares a signal vdet_lpf obtained by performing the low-pass filter processing on the current speed vdet output from the current speed detecting unit 103 on the LPF 105 with the target speed $vtgt_{12}$ obtained by adding the target speeds $vtgt_1$ and $vtgt_2$, and outputs the signal ve_lpf. That is to say, the speed comparison unit 104" obtains the signal ve_lpf that is obtained by performing the low-pass filter processing on the speed error verr in accordance with the following equation (9).

$$ve\_lpf = vtgt_2 + vtgt_2 - vdet\_lpf; \qquad (9)$$

Figure 15:
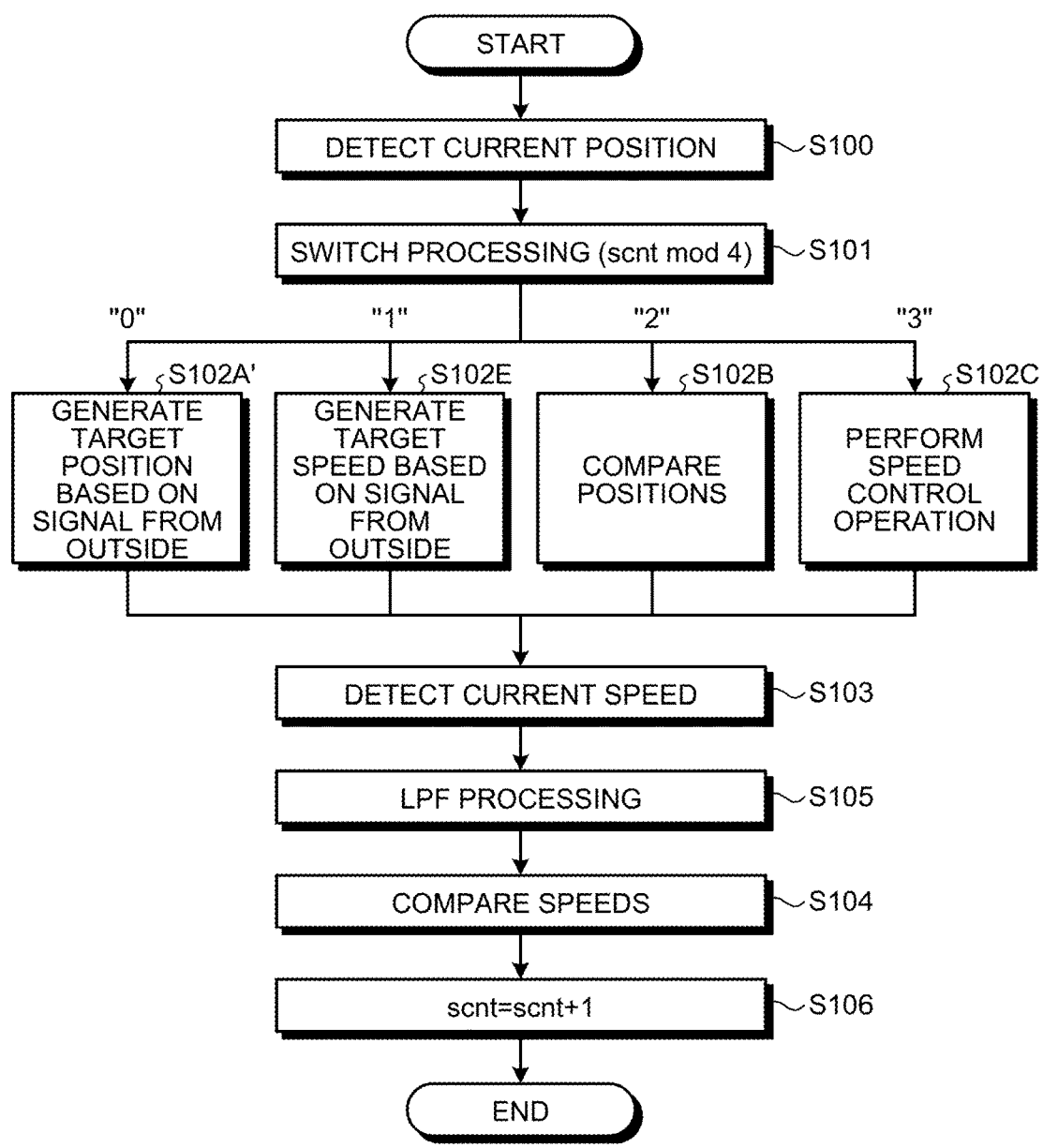
FIG. 15 is a flowchart illustrating an example of interrupt processing in the fourth embodiment.

FIG. 15 is a flowchart illustrating an example of the interrupt processing in the fourth embodiment. In FIG. 15, the same reference numerals denote the pieces of processing common to those in the above-mentioned flowchart in FIG. 12, and detail description thereof is omitted.

As illustrated in FIG. 15, in the interrupt processing in the fourth embodiment, the order of the speed comparison at step S104 and the low-pass filter processing at step S105 is switched from that in the flowchart in FIG. 12 so as to correspond to the arrangement of the LPF 105 in the functional block diagram as illustrated in FIG. 14. That is to say, in the example of FIG. 15, the current speed detecting unit 103 detects the current speed vdet at step S103. Then, the LPF 105 performs the low-pass filter processing on the current speed vdet at subsequent step S105. Thereafter, at subsequent step S104, the speed comparison unit 104"

performs the speed comparison processing on the current speed vdet by using the signal vdet_lpf on which the low-pass filter processing has been performed.

In the fourth embodiment, the LPF 105 performs the low-pass filter processing on only the current speed vdet among the target speeds $vtgt_1$ and $vtgt_2$, and the current speed vdet before the processing by the speed comparison unit 104". This can obtain the smoothened current speed vdet_lpf before the speed comparison processing by the speed comparison unit 104".

The current speed vdet before smoothened is obtained only on the pulse taking any one of the coefficient Gv and 0 by the differential operation. It is difficult to use the current speed vdet before smoothened for other applications such as the change of control parameters such as the gain, for example, in accordance with the current speed vdet. On the other hand, as in the fourth embodiment, the smoothened current speed vdet_lpf can be used for other applications easily, thereby achieving diversified control.

The LPF 105 performs the low-pass filter processing on the current speed vdet output from the current speed detecting unit 103. This can suppress noise of the current speed vdet, thereby achieving control with higher accuracy. The low-pass filter processing by the LPF 105 at step S105 is executed every time the interrupt processing is performed. This enables speed control with high accuracy to be performed even when the motor 12 is made to rotate at a high speed.

Figure 16:
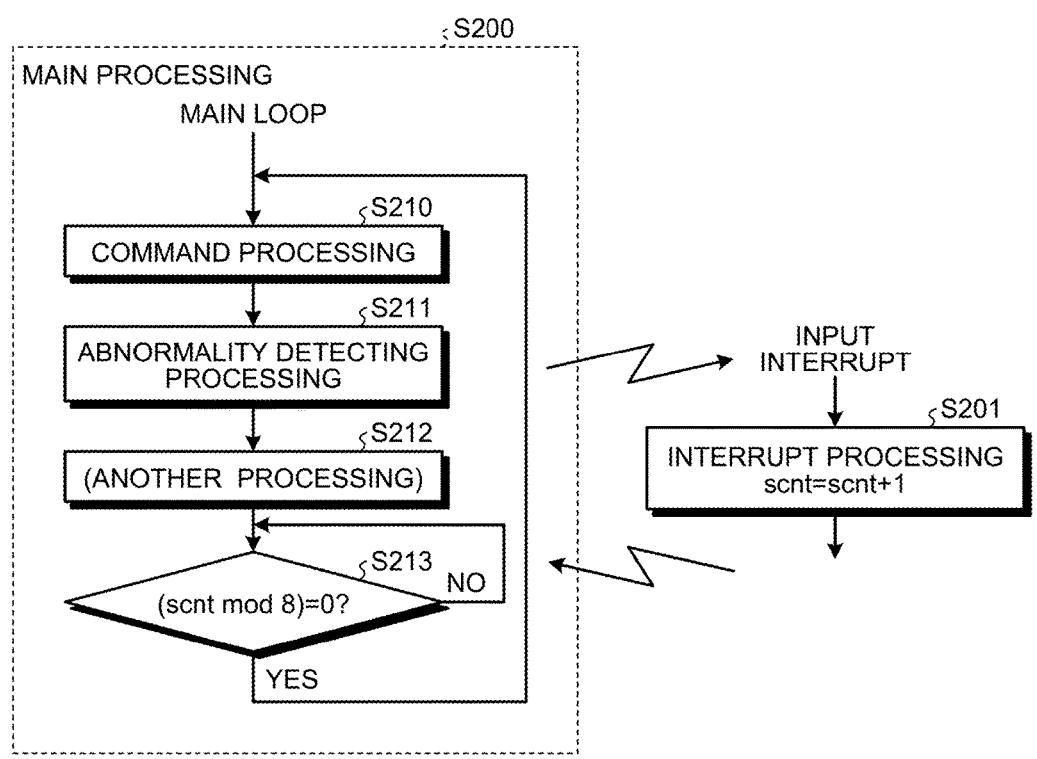
FIG. 16 is a flowchart for explaining the interrupt processing in a control unit that can be applied to respective embodiments and modifications of the embodiments.

Interrupt Processing that can be Applied to Embodiments and Modifications of Embodiments Described is interrupt processing in the control unit 10 that can be applied to the above-mentioned respective embodiments and modifications of the embodiments. FIG. 16 is a flowchart for explaining the interrupt processing in the control unit 10 that can be applied to the above-mentioned respective embodiments and modifications of the embodiments. The flowchart as illustrated in FIG. 16 can be applied to both the above-mentioned motor control apparatus 1 and motor control apparatus 1'. Hereinafter, description is made while the respective pieces of processing in the flowchart as illustrated in FIG. 16 are assumed to be executed in the motor control apparatus 1.

As illustrated in FIG. 16, the pieces of processing in the control unit 10 include a main loop at step S200 in which pieces of main processing are performed and interrupt processing at step S201 that is interrupted in the main loop to be executed, as a whole. The interrupt input that is output from the interrupt unit 22, that is, the interrupt request int triggers execution of the interrupt processing at step S201, for example. In the main processing at step S200, when the interrupt processing at step S201 is not executed, the control unit 10 executes the pieces of processing at step S210 to step S213 repeatedly.

The control unit 10 executes command processing at step S210. The control unit 10 receives various types of commands including a start command and a stop command of the motor 12, and the target position command that have been transmitted from a high-order device through an appropriate communication interface (not illustrated), for example, at step S210. Then, the control unit 10 controls a part of or overall the motor control apparatus 1 so as to operate or stop the motor 12 in accordance with the received commands.

The control unit 10 executes abnormality detection processing of detecting abnormality of the operations of the motor 12 at subsequent step S211. The control unit 10 monitors values of various types of variables that are updated in accordance with the motor control processing and the operations in the interrupt processing regularly. When the monitored value exceeds a threshold or a predetermined range, the control unit 10 determines that the present state is abnormal. Examples of the values that are monitored by the control unit 10 include the speed error verr as the difference between the target speed $vtgt_1$ and the current speed vdet, the difference between the target position xtgt and the current position xdet, and a value of the motor drive command signal ctl as a control output value.

When the control unit 10 determines that the current state of the motor 12 is abnormal, the control unit 10 executes third processing for coping with the determined abnormal state. For example, the control unit 10 controls the driver 11 to turn off the rotation of the motor 12, as the third processing. Alternatively, for example, the control unit 10 performs processing of notifying the high-order device of the abnormal state, as the third processing.

Subsequent step S212 is reserved for another processing. No processing is executed at step S213 in the flowchart in FIG. 16.

The control unit 10 performs determination processing of the number of times of interrupts based on the count variable scnt at subsequent step S213. The control unit 10 monitors a value of the count variable scnt that is incremented every time the interrupt processing is executed at step S201 and determines whether the value of the count variable scnt is increased by 8, for example. In the example of FIG. 16, the control unit 10 obtains a residue obtained by dividing the count variable scnt by 8. When the residue becomes 0, the control unit 10 determines that the value of the count variable scnt is increased by 8. When the control unit 10 determines that the value of the count variable scnt is increased by 8, the process is returned to step S210.

Accordingly, the control unit 10 functions as a loop processing unit of executing the above-mentioned third processing every time the interrupt processing starts predetermined number of times.

On the other hand, the processing at step S201 is the interrupt processing, and is executed in priority to the pieces of processing in the main loop at step S200 at a predetermined interrupt cycle. To be more specific, the interrupt processing at step S201 corresponds to a series of pieces of processing in the above-mentioned flowchart in FIG. 4, FIG. 7, FIG. 10, FIG. 12, or FIG. 15. In the respective flowcharts, the count variable scnt is incremented by 1 at step S106 as final processing.

In FIG. 16, with the determination at step S213, a series of the pieces of processing in the main loop at step S200 are executed once while the interrupt processing is executed eight times and the respective pieces of processing in the main loop are executed once every time the interrupt processing at step S201 is executed eight times. Accordingly, accurate time management can be also achieved in the main processing.

For example, in the abnormality detection processing at step S211, it is necessary to perform accurate time measurement such as the measurement whether the abnormal state is kept for a predetermined time. With the processing in the flowchart in FIG. 16, the time measurement can be performed based on the interrupt cycle, thereby eliminating necessity of provision of hardware such as a timer. This can execute the time measurement at low cost.

In addition, unlike the interrupt processing that should be completed in the interrupt cycle reliably, the pieces of processing that take a long time can be executed in the main loop. This can achieve multifunctional control at low cost.

For example, it can take a sufficient processing time for the detection processing of the abnormal state at step S211, so that the abnormality detection can be performed reliably so as to perform control with high reliability.

The embodiment provides an advantageous effect of enabling driving control of a motor with high accuracy without using expensive hardware to be performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A motor control apparatus comprising:
    a driving control unit configured to control at least one of a rotating position and a rotating speed of a motor in accordance with a drive command based on an encoded signal, the encoded signal changing periodically in accordance with the rotating position of the motor;
    an interrupt control unit configured to start and execute interrupt processing for performing the driving control at an interrupt cycle;
    a first processing unit configured to execute first processing that detects the rotating position of the motor based on the encoded signal; and
    a second processing unit configured to select and execute second processing that outputs the drive command of the motor in accordance with the rotating position of the motor detected by the first processing unit, wherein
        the interrupt control unit is configured to execute the first processing before executing the second processing in the interrupt processing.

2. The motor control apparatus according to claim 1, further comprising:
    a target position generating unit that generates a target position, wherein
        at least one of the first processing unit and the second processing unit further includes a first target speed generation unit that compares the target position with the rotating position and generates a first target speed in accordance with a comparison result,
        the first processing unit further includes a speed comparison unit that acquires a difference of the rotating position at the interrupt cycle, calculates the rotating speed based on the acquired difference, and compares the calculated rotating speed with the first target speed so as to acquire a speed error, and
        the second processing unit further includes a speed control unit that generates the drive command in accordance with the speed error.

3. The motor control apparatus according to claim 2, wherein the target position generating unit generates the target position in accordance with an input signal from outside.

4. The motor control apparatus according to claim 2, wherein
    at least one of the first processing unit and the second processing unit further includes a second target speed generation unit that acquires a difference of the target position every time the interrupt processing starts a predetermined number of times, and generates a second target speed based on the acquired difference, and
    the speed comparison unit compares a value obtained by adding the first target speed and the second target speed with the rotating speed so as to acquire the speed error.

5. The motor control apparatus according to claim 4, wherein
    the first processing unit further includes a low-pass filter that extracts a low-frequency component of the rotating speed,
    the speed comparison unit compares the low-frequency component extracted by the low-pass filter with a value obtained by adding the first target speed and the second target speed so as to acquire the speed error.

6. The motor control apparatus according to claim 4, wherein
    the first processing unit further includes a low-pass filter that extracts a low-frequency component of the speed error acquired by the speed comparison unit, and
    the speed control unit generates the drive command in accordance with the low-frequency component extracted by the low-pass filter.

7. The motor control apparatus according to claim 1, further comprising:
    a third processing unit that executes third processing when the interrupt processing is not executed; and
    a loop processing unit that causes the third processing to be executed every time the interrupt processing starts a predetermined number of times, wherein
    the third processing unit determines an abnormal state in accordance with at least one of the drive command generated during the interrupt processing and the rotating position acquired during the interrupt processing.

8. The motor control apparatus according to claim 1, wherein the first processing unit executes same first processing every time the interrupt processing starts.

9. A motor control method comprising:
    controlling at least one of a rotating position and a rotating speed of a motor in accordance with a drive command based on an encoded signal, the encoded signal changing periodically in accordance with the rotating position of the motor;
    starting and executing interrupt processing for performing the driving control at an interrupt cycle;
    executing first processing that detects the rotating position of the motor based on the encoded signal; and
    selecting and executing second processing that outputs the drive command of the motor in accordance with the rotating position of the motor detected by the first processing unit, wherein
        at the starting and executing of the interrupt processing, the first processing is executed before executing the second processing in the interrupt processing.

10. The motor control method according to claim 9, further comprising:
    generating a target position, wherein
        at least one of the first processing and the second processing further includes comparing the target position with the rotating position and generating a first target speed in accordance with a comparison result,
        the first processing further includes acquiring a difference of the rotating position at the interrupt cycle, calculating the rotating speed based on the acquired difference, and comparing the calculated rotating speed with the first target speed so as to acquire a speed error, and
        the second processing further includes generating the drive command in accordance with the speed error.

11. The motor control method according to claim 10, wherein the generating the target position generates the target position in accordance with an input signal from outside.

12. The motor control method according to claim 10, wherein
at least one of the first processing and the second processing further includes acquiring a difference of the target position every time the interrupt processing starts a predetermined number of times, and generating a second target speed based on the acquired difference, and
the acquiring the speed error includes comparing a value obtained by adding the first target speed and the second target speed with the rotating speed so as to acquire the speed error.

13. The motor control method according to claim 12, wherein
the first processing further includes extracting, via a low-pass filter, a low-frequency component of the rotating speed, and
the acquiring the speed error includes comparing the low-frequency component extracted by the low-pass filter with a value obtained by adding the first target speed and the second target speed so as to acquire the speed error.

14. The motor control method according to claim 12, wherein
the first processing further includes extracting, via a low-pass filter, a low-frequency component of the speed error, and
the generating the drive command generates the drive command in accordance with the low-frequency component extracted by the low-pass filter.

15. The motor control method according to claim 9, further comprising:

executing third processing when the interrupt processing is not executed; and
causing the third processing to be executed every time the interrupt processing starts a predetermined number of times, wherein
the third processing determines an abnormal state in accordance with at least one of the drive command generated during the interrupt processing and the rotating position acquired during the interrupt processing.

16. The motor control method according to claim 9, wherein the first processing executes same first processing every time the interrupt processing starts.

17. A non-transitory computer-readable storage medium in which computer-readable program codes are stored, wherein the program codes when executed cause a computer to execute:
controlling at least one of a rotating position and a rotating speed performing driving control of a motor in accordance with a drive command based on an encoded signal, the encoded signal changing periodically in accordance with the rotating position of the motor;
starting and executing interrupt processing for performing the driving control at an interrupt cycle;
executing first processing that detects the rotating position of the motor based on the encoded signal; and
selecting and executing second processing that outputs the drive command of the motor in accordance with the rotating position of the motor detected by the first processing unit, wherein
at the starting and executing of the interrupt processing, the first processing is executed before executing the second processing in the interrupt processing.

* * * * *